United States Patent
Ashizawa et al.

(12)

(10) Patent No.: US 10,656,512 B2
(45) Date of Patent: May 19, 2020

(54) LIGHT SOURCE DEVICE, PROJECTOR, AND METHOD FOR CONTROLLING LIGHT SOURCE DEVICE

(71) Applicant: SEIKO EPSON CORPORATION, Tokyo (JP)

(72) Inventors: Kenichiro Ashizawa, Azumino (JP); Kenichi Kitagawa, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/873,232

(22) Filed: Jan. 17, 2018

(65) Prior Publication Data
US 2018/0217483 A1   Aug. 2, 2018

(30) Foreign Application Priority Data
Jan. 30, 2017   (JP) ................. 2017-014020

(51) Int. Cl.
*G03B 21/20*   (2006.01)
*G03B 33/12*   (2006.01)

(52) U.S. Cl.
CPC ......... *G03B 21/206* (2013.01); *G03B 21/204* (2013.01); *G03B 21/208* (2013.01); *G03B 21/2046* (2013.01); *G03B 21/2053* (2013.01); *G03B 21/2066* (2013.01); *G03B 21/2073* (2013.01); *G03B 33/12* (2013.01)

(58) Field of Classification Search
CPC .............. G03B 21/206; G03B 21/2046; G03B 21/2053; G03B 21/2066; G03B 21/2073
See application file for complete search history.

(56) References Cited

U.S. PATENT DOCUMENTS

| | | | |
|---|---|---|---|
| 7,753,554 B2 | 7/2010 | Tanaka | |
| 2009/0059557 A1 | 3/2009 | Tanaka | |
| 2009/0224697 A1* | 9/2009 | Sugaya | H04N 9/3114 315/307 |
| 2014/0204346 A1* | 7/2014 | Lee | H04N 9/3114 353/31 |
| 2016/0360166 A1* | 12/2016 | Ogawa | G02B 26/008 |

FOREIGN PATENT DOCUMENTS

| | | |
|---|---|---|
| JP | 2006-330176 A | 12/2006 |
| JP | 2012-053279 A | 3/2012 |

* cited by examiner

*Primary Examiner* — Cara E Rakowski
*Assistant Examiner* — Magda Cruz
(74) *Attorney, Agent, or Firm* — Oliff PLC

(57) ABSTRACT

An embodiment of a light source device according to the invention includes: a light source unit configured to emit light; a first optical element on which the light emitted from the light source unit is incident; a first drive unit configured to rotate the first optical element; and a control unit configured to control the light source unit and the first drive unit. The control unit is configured to continue rotating the first optical element during a first period until a first predetermined time passes after the light source unit is turned off.

19 Claims, 8 Drawing Sheets

LIGHT SOURCE DEVICE, PROJECTOR, AND METHOD FOR CONTROLLING LIGHT SOURCE DEVICE

BACKGROUND

1. Technical Field

The present invention relates to a light source device, a projector, and a method for controlling a light source device.

2. Related Art

A fluorescent light emitting device which has a fluorescent wheel and a wheel motor for rotationally driving the fluorescent wheel is known. For example, JP-A-2012-053279 discloses a fluorescent light emitting device installed in a projector.

In the fluorescent light emitting device (light source device) as described above, in order to diffuse and radiate heat generated by excitation light cast on the fluorescent wheel (first optical element), the fluorescent wheel is rotated by the wheel motor (first drive unit) and the position where the excitation light is cast on the fluorescent wheel is thus changed. Therefore, for example, if the excitation light is cast on the fluorescent wheel without rotating the fluorescent wheel, the fluorescent wheel may be damaged by the heat of the excitation light in some cases. Thus, it is necessary to cast the excitation light on the fluorescent wheel after rotating the fluorescent wheel.

In some cases, the wheel motor is not equipped with a rotation sensor, for example, for reasons such as cost reduction. In such cases, a control unit which controls the wheel motor cannot grasp the rotational position of the wheel motor immediately after the power of the wheel motor is turned on from off-state. Therefore, when driving the wheel motor again, it is necessary to provide a period for adjusting the rotational position of the wheel motor and it takes time until the fluorescent wheel is rotated again. Since the casting of the excitation light on the fluorescent wheel needs to be carried out after the fluorescent wheel is rotated, as described above, there is a problem that it takes time until light is emitted when the fluorescent light emitting device is started up.

SUMMARY

An advantage of some aspects of the invention is that a light source device that can reduce the time until light is emitted after startup and a projector having such a light source device are provided. Another advantage is that a method for controlling a light source device that can reduce the time until light is emitted after startup is provided.

An aspect of a light source device according to the invention includes: a light source unit configured to emit light; a first optical element on which the light emitted from the light source unit is incident; a first drive unit configured to rotate the first optical element; and a control unit configured to control the light source unit and the first drive unit. The control unit is configured to continue rotating the first optical element during a first period until a first predetermined time passes after the light source unit is turned off.

In the aspect of the light source device according to the invention, the control unit continues rotating the first optical element during the first period until the first predetermined time passes after the light source unit is turned off. Therefore, even if the power of the light source device is turned on in the first period so as to turn on the light source unit, the power already supplied to the first drive unit and therefore the time to start supplying power to the first drive unit is not needed. Also, since the first drive unit is already in the rotating state, there is no need to adjust the rotational position of the first drive unit. Therefore, the time until light is emitted from the light source unit after the power of the light source device is turn on again can be reduced. Thus, with this configuration, a light source device that can reduce the time until light is emitted after startup is provided.

The control unit may be configured to set a number of rotations of the first optical element to a predetermined number of rotations in the first period. The predetermined number of rotations may be smaller than a number of rotations of the first optical element before the light source unit is turned off and be equal to or greater than a number of rotations for lighting of the first optical element when lighting of the light source unit is started before the light source unit is turned off.

With this configuration, when the power of the light source device is turned on again in the first period, it takes no time until the number of rotations of the first optical element becomes equal to or greater than the number of rotations for lighting when the lighting of the light source unit is started before the light source unit is turned off, and the light source unit can be turned on immediately. Thus, the time until light is emitted after the startup of the light source device can be reduced further. Also, damage to the first optical element due to the heat of the light emitted from the light source unit can be restrained even if the light source unit is turned on immediately.

Also, since the number of rotations of the first optical element can be made relatively small in the first period, the power consumption by the first drive unit to rotate the first optical element can be reduced. Thus, the power consumption by light source device can be reduced. Moreover, since the number of rotations can be made relatively small, the noise generated by the rotation of the first drive unit in the first period can be reduced.

The control unit may be configured to, in the case where the light source unit is turned on in the first period, turn on the light source unit and increase the number of rotations of the first optical element from the predetermined number of rotations to the number of rotations of the first optical element before the light source unit is turned off.

With this configuration, damage to the first optical element due to the heat of the light emitted from the light source unit can be restrained further.

The control unit may be configured to maintain, in the first period, the number of rotations of the first optical element to the number of rotations of the first optical element before the light source unit is turned off.

With this configuration, there is no need to reduce the number of rotations of the first optical element in the first period. Also, in the case where the power of the light source device is turned on in the first period, there is no need to increase the number of rotations of the first optical element. Therefore, the control by the control unit can be simplified.

The control unit may be configured to, in the case where the light source unit is turned on in the first period, turn on the light source unit with a quantity of light before the light source unit is turned off.

With this configuration, the quantity of light of the light emitted from the light source device can be made the same as in normal light-on time, from the moment when the power of the light source device is turned on and the light source unit is turned on.

The control unit may be configured to set a number of rotations of the first optical element to a predetermined number of rotations in the first period. The predetermined number of rotations may be smaller than a number of rotations for lighting of the first optical element when lighting of the light source unit is started before the light source unit is turned off.

With this configuration, the power consumption by and the noise of the first drive unit can be reduced in the first period.

The control unit may be configured to, in the case where the light source unit is turned on in the first period, increase the number of rotations of the first optical element from the predetermined number of rotations, turn on the light source unit for a second predetermined time with a smaller quantity of light than the quantity of light in the lighting of the light source unit started in response to the number of rotations of the first optical element reaching the number of rotations for lighting, and increase the quantity of light of the light source unit.

With this configuration, at first, the light source unit is turned on with a smaller quantity of light than the quantity of light in the lighting of the light source unit started in response to the number of rotations of the first optical element reaching the number of rotations for lighting. Therefore, in the case where the number of rotations of the first optical element is made smaller than the number of rotations for lighting in the first period, even if the light source unit is turned on at the moment when the power of the light source device is turned on, damage to the first optical element due to the light from the light source unit can be restrained. Therefore, the power consumption by the light source device can be reduced by making the number of rotations of the first optical element relatively small in the first period, and the time until light is emitted after the startup of the light source device can be reduced. Also, since the quantity of light of the light source unit increases with the increase in the number of rotations of the first optical element, the quantity of light of the light emitted from the light source device can be made the same as in normal light-on time.

The control unit may be configured to, in the case where the light source unit is turned on in the first period, increase the number of rotations of the first optical element from the predetermined number of rotations in the state where the light source unit is off, and turn on the light source unit when the number of rotations of the first optical element becomes equal to or greater than the number of rotations for lighting.

With this configuration, the light source unit is not turned on in the state where the number of rotations of the first optical element is smaller than the number of rotations for lighting. Thus, damage to the first optical element due to the heat of the light emitted from the light source unit can be restrained.

The control unit may be configured to stop the rotation of the first optical element, in the case where the light source unit is not turned on in the first period.

The first optical element may be configured to be a wavelength conversion element configured to convert a wavelength of light incident from the light source unit, or a diffusion element configured to diffuse light incident from the light source unit.

With this configuration, the one aspect of the embodiment can be applied to a light source device having one of these elements.

The light source device may also include a second optical element on which the light emitted from the light source unit is incident, and a second drive unit configured to rotate the second optical element. The control unit may rotate the second optical element in the first period. The first optical element may be the wavelength conversion element. The second optical element may be the diffusion element.

With this configuration, the one aspect of the embodiment can be applied to a light source device having both a wavelength conversion element and a diffusion element.

A number of rotations of the second optical element may be configured to be smaller than the number of rotations of the first optical element, in the first period.

For example, in some cases, the diffusion element is more heat-resistant than the wavelength conversion element, and the number of rotations for lighting of the diffusion element is smaller than the number of rotations for lighting of the wavelength conversion element. In such cases, in the first period, the predetermined number of rotations of the diffusion element can be made equal to or greater than the number of rotations for lighting even if it is smaller than the predetermined number of rotations of the wavelength conversion element. Therefore, while the number of rotations of the diffusion element in the first period is reduced further, damage to the diffusion element can be restrained even if the light source unit is turned on immediately when the power of the light source device is turned on again. Thus, the power consumption by the second drive unit rotating the diffusion element can be reduced.

An aspect of a projector according to the invention includes: the light source device described above; a light modulation device configured to modulate light emitted from the light source device according to an image signal; and a projection system configured to project the light modulated by the light modulation device.

The aspect of the projector according to the invention has the light source device described above. Therefore, when the power of the projector is turned on again after the power of the projector is turned off, the time until light is emitted from the light source unit and an image is projected can be reduced. Thus, convenience for the user can be improved.

An aspect of a method for controlling a light source device according to the invention is a method for controlling a light source device including a light source unit configured to emit light, a first optical element on which light emitted from the light source unit is incident, and a first drive unit configured to rotate the first optical element. The method includes turning off the light source unit, and continuing rotating the first optical element during a first period until a first predetermined time passes after the light source unit is turned off.

According to the aspect of the method for controlling the light source device according to the invention, the time until light is emitted after startup can be reduced, similarly to the foregoing configurations.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
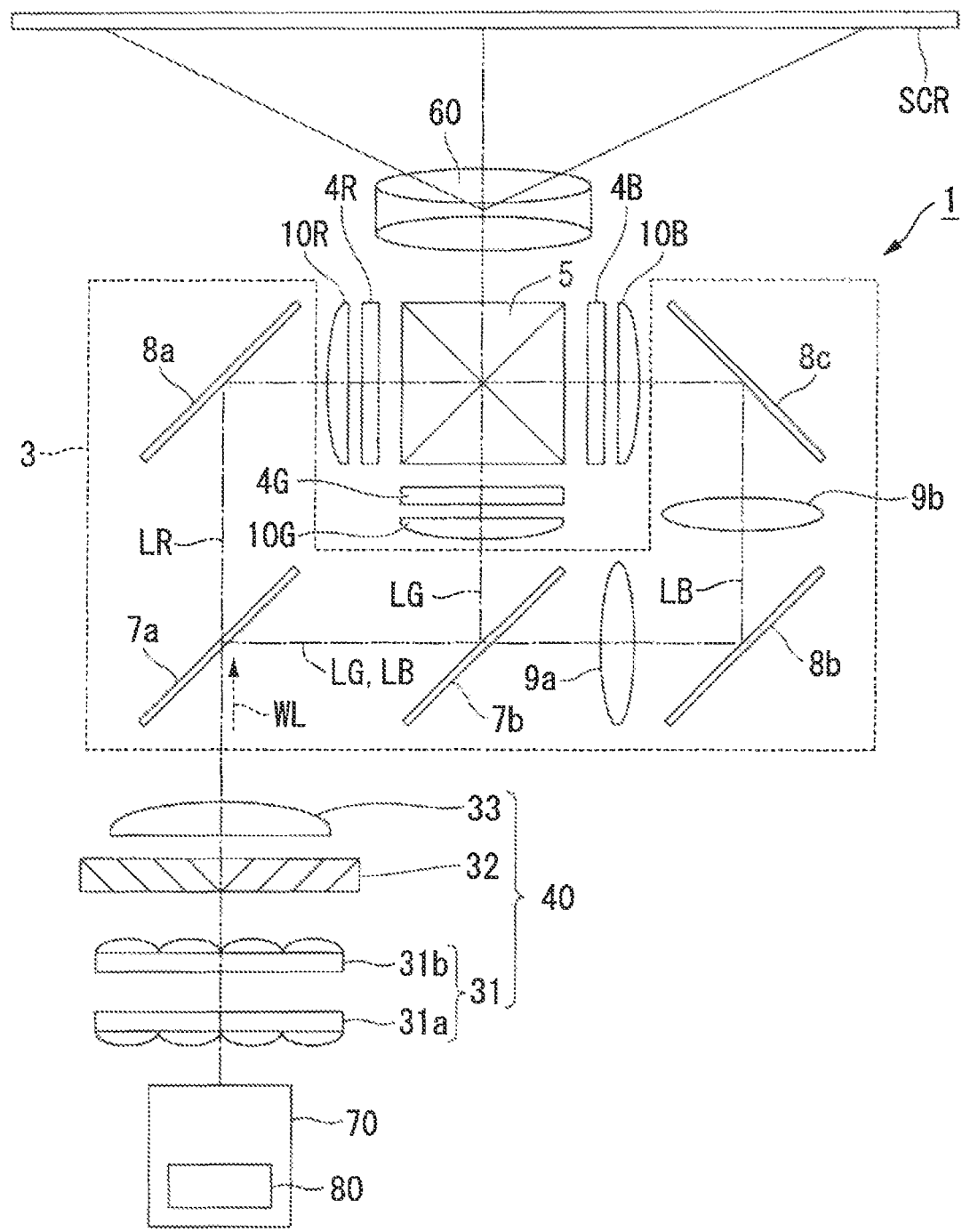
FIG. 1 is a schematic configuration view showing a projector according to a first embodiment.

Hereinafter, a projector according to an embodiment of the invention will be described with reference to the drawings. However, the scope of the invention is not limited to the embodiments below. Arbitrary changes can be made within the range of technical idea of the invention. In the drawings below, the scale, number or the like of each structure may be different from the actual structure in order to make each configuration easy to understand.

First Embodiment

FIG. 1 is schematic configuration view showing a projector 1 according to this embodiment. As shown in FIG. 1, the projector 1 according to this embodiment is a projection-type image display device which displays a color image on a screen SCR. The projector 1 has a light source device 70, a uniform illumination system 40, a color separation system 3, a light modulation device 4R for red light, a light modulation device 4G for green light, a light modulation device 4B for blue light, a light combining system 5, and a projection system 60.

The light source device 70 emits white illumination light WL toward the uniform illumination system 40.

The uniform illumination system 40 has a homogenizer system 31, a polarization conversion element 32, and a superimposing system 33. The homogenizer system 31 is configured of a first multi-lens array 31a and a second multi-lens array 31b. The uniform illumination system 40 uniformizes the intensity distribution of the illumination light WL emitted from the light source device 70, at the light modulation device 4R, the light modulation device 4G, and the light modulation device 4B, which are illuminated areas. The illumination light WL emitted from the uniform illumination system 40 becomes incident on the color separation system 3.

The color separation system 3 separates the illumination light WL emitted from the light source device 70 into red light LR, green light LG, and blue light LB. The color separation system 3 has a first dichroic mirror 7a, a second dichroic mirror 7b, a first reflection mirror 8a, a second reflection mirror 8b, a third reflection mirror 8c, a first relay lens 9a, and a second relay lens 9b.

The first dichroic mirror 7a separates the illumination light WL emitted from the light source device 70 into the red light LR, and light including the green light LG and the blue light LB. The first dichroic mirror 7a transmits the red light LR and reflects the green light LG and the blue light LB. The second dichroic mirror 7b separates the light reflected by the first dichroic mirror 7a into the green light LG and the blue light LB. The second dichroic mirror 7b reflects the green light LG and transmits the blue light LB.

The first reflection mirror 8a is arranged in the optical path of the red light LR. The first reflection mirror 8a reflects the red light LR transmitted through the first dichroic mirror 7a, toward the light modulation device 4R. The second reflection mirror 8b and the third reflection mirror 8c guide the blue light LB transmitted through the second dichroic mirror 7b, to the light modulation device 4B. The green light LG is reflected by the second dichroic mirror 7b and travels toward the light modulation device 4G.

The first relay lens 9a and the second relay lens 9b are arranged on the light exiting side of the second dichroic mirror 7b in the optical path of the blue light LB. The first relay lens 9a and the second relay lens 9b compensate for the optical loss of the blue light LB caused by the fact that the optical path length of the blue light LB is longer than the optical path length of the red light LR and the optical path length of the green light LG.

Each of the light modulation devices 4R, 4G, 4B modulates the light emitted from the light source device 70, according to an image signal. The light modulation device 4R modulates the red light LR according to an image signal and forms image light corresponding to the red light LR. The light modulation device 4G modulates the green light LG according to an image signal and forms image light corresponding to the green light LG. The light modulation device 4B modulates the blue light LB according to an image signal and forms image light corresponding to the blue light LB. As each the light modulation device 4R, the light modulation device 4G, and the light modulation device 4B, for example, a transmission-type liquid crystal panel is used. A polarizer, not illustrated, is arranged on the light incident side and the light exiting side of the liquid crystal panel. The polarizer transmits linearly polarized light having a specific direction of polarization.

A field lens 10R is arranged on the light incident side of the light modulation device 4R. A field lens 10G is arranged on the light incident side of the light modulation device 4G. A field lens 10B is arranged on the light incident side of the light modulation device 4B. The field lens 10R parallelizes the red light LR incident on the light modulation device 4R. The field lens 10G parallelizes the green light LG incident on the light modulation device 4G. The field lens 10B parallelizes the blue light LB incident on the light modulation device 4B.

The light combining system 5 combines the image light corresponding to the red light LR, the green light LG, and the blue light LB, and emits the combined image light toward the projection system 60. As the light combining system 5, for example, a cross dichroic prism is used.

The projection system 60 is configured of a projection lens group including a plurality of projection lenses. The projection system 60 projects the image light combined by the light combining system 5, in an enlarged form onto the screen SCR. That is, the projection system 60 projects the light modulated by each of the light modulation devices 4R, 4G, 4B. Thus, an enlarged color image is displayed on the screen SCR.

The light source device 70 will be described below.

Figure 2:
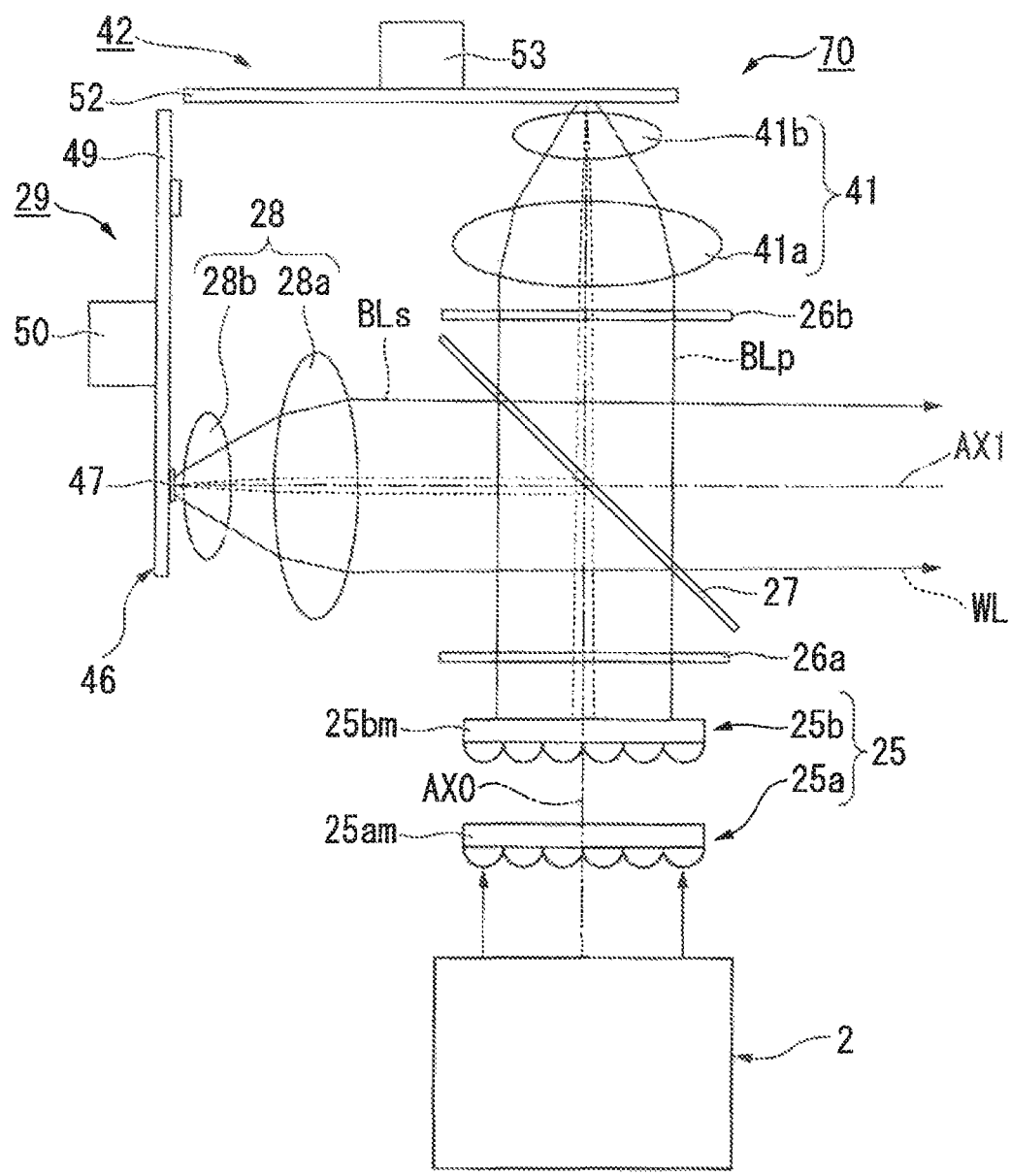
FIG. 2 is a schematic configuration view of a light source device according to the first embodiment.

FIG. 2 is a schematic configuration view of the light source device 70 in this embodiment.

As shown in FIGS. 1 and 2, the light source device 70 has a light source unit 2, a homogenizer system 25, a first retardation film 26a, a polarization beam splitter 27, a first pickup system 28, a rotating wavelength conversion device 29 having a fluorescent layer 47, a second retardation film 26b, a second pickup system 41, a rotating diffusion device 42, and a control unit 80.

As shown in FIG. 2, the light source unit 2, the homogenizer system 25, the first retardation film 26a, the polarization beam splitter 27, the second retardation film 26b, and the second pickup system 41 are arranged on an optical axis AX0. The first pickup system 28 is arranged on an optical axis AX1 that is orthogonal to the optical axis AX0.

The light source unit 2 emits light. For example, the light source unit 2 has a laser light source which emits a blue laser beam.

The homogenizer system 25 uniformizes the intensity distribution of a pencil of light emitted from the light source unit 2, in the illuminated area. The homogenizer system 25 is configured of, for example, a first multi-lens array 25a and a second multi-lens array 25b. The first multi-lens array 25a has a plurality of lenses 25am. The second multi-lens array 25b has a plurality of lenses 25bm.

The first retardation film 26a is configured of, for example, a rotatable half-wave plate. The light emitted from the light source unit 2 is linearly polarized light. Therefore, by properly setting the angle of rotation of the first retardation film 26a, it is possible to convert the light incident on the first retardation film 26a to light including an S-polarized light component and a P-polarized light component with a predetermined ratio with respect to the polarization beam splitter 27. By changing the angle of rotation of the first retardation film 26a, it is possible to change the ratio of the S-polarized light component to the P-polarized light component.

The polarization beam splitter 27 is arranged in such a way as to form an angle of 45 degrees to the optical axis AX0 and the optical axis AX1. The polarization beam splitter 27 reflects the S-polarized light component of the incident light and transmits the P-polarized light component of the incident light. The S-polarized light component is reflected by the polarization beam splitter 27 and travels toward the rotating wavelength conversion device 29. The P-polarized light component is transmitted through the polarization beam splitter 27 and travels toward the rotating diffusion device 42.

A beam BLs of the S-polarized light emitted from the polarization beam splitter 27 becomes incident on the first pickup system 28. The first pickup system 28 condenses the beam BLs toward the fluorescent layer 47 of the rotating wavelength conversion device 29. The first pickup system 28 is configured of a first pickup lens 28a and a second pickup lens 28b. The light emitted from the first pickup system 28 becomes incident on the fluorescent layer 47 of the rotating wavelength conversion device 29.

The rotating wavelength conversion device 29 has a wavelength conversion element (first optical element) 46 and a first motor (first drive unit) 50.

On the wavelength conversion element 46, the light from the light source unit 2, that is, the light emitted from the first pickup system 28 in this embodiment, becomes incident.

The wavelength conversion element 46 is a reflection-type rotating fluorescent plate. The wavelength conversion element 46 has the fluorescent layer 47 emitting a fluorescent ray, a rotating plate 49 supporting the fluorescent layer 47, and a reflection film (not illustrated) which is provided between the fluorescent layer 47 and the rotating plate 49 and reflects fluorescent ray.

The fluorescent layer 47 is arranged in an annular shape on the rotating plate 49. In this embodiment, the fluorescent layer 47 contains a plurality of fluorescent particles that absorbs the beam BLs, which is a blue laser beam, and then converts the beam BLs to a yellow fluorescent ray and emits the yellow fluorescent ray. Thus, the wavelength conversion element 46 converts the wavelength of the beam BLs, which is the light incident from the light source unit 2. As the fluorescent particles, for example, a YAG (yttrium aluminum garnet)-based fluorescent material can be used. The plurality of fluorescent particles may be made up of one type of particles or may be a plurality of types of particles made of different materials from each other.

The rotating wavelength conversion device 29 has the reflection film and therefore emits the fluorescent ray emitted from the fluorescent layer 47, toward the polarization beam splitter 27. As the rotating plate 49, for example, a disk may be used. However, the shape of the rotating plate 49 is not limited to a circular shape.

The first motor 50 rotates the rotating plate 49 and thus rotates the wavelength conversion element 46. The axis of rotation of the first motor 50 is arranged substantially parallel to the optical axis AX1. Thus, the wavelength conversion element 46 is rotatable within a plane that intersects with the optical axis of the light incident on the wavelength conversion element 46. The first motor 50 is not provided with a rotation sensor.

Meanwhile, a beam BLp of the P-polarized light emitted from the polarization beam splitter 27 becomes incident on the second retardation film 26b. The second retardation film 26b is configured of a quarter-wave plate. The beam BLp is transmitted through the second retardation film 26b and thereby converted to circularly polarized light. The beam BLp transmitted through the second retardation film 26b becomes incident on the second pickup system 41. The second pickup system 41 condenses the beam BLp toward the rotating diffusion device 42. The second pickup system 41 is configured of a first pickup lens 41a and a second pickup lens 41b.

The rotating diffusion device 42 has a diffusion element (second optical element) 52 and a second motor (second drive unit) 53 which rotates the diffusion element 52.

On the diffusion element 52, the light from the light source unit 2, that is, the beam BLp of the circularly polarized light emitted from the second pickup system 41 in this embodiment becomes incident. The diffusion element 52 diffuses the incident beam BLp and reflects the beam BLp toward the polarization beam splitter 27.

It is preferable that the diffusion element 52 reflects the beam BLp incident on the diffusion element 52 by Lambertian reflectance. The axis of rotation of the second motor 53 is arranged substantially parallel to the optical axis AX0. Thus, the diffusion element 52 is rotatable within a plane that intersects with the optical axis of the light incident on the diffusion element 52. The diffusion element 52 is formed, for example, in a circular shape as viewed along the direction of the axis of rotation. However, the shape of the diffusion element 52 is not limited to the circular shape. The second motor 53 is not provided with a rotation sensor.

The beam BLp reflected by the diffusion element 52 is transmitted again through the second pickup system 41 and the second retardation film 26b and becomes incident on the polarization beam splitter 27. The beam BLp transmitted again through the second retardation film 26b becomes a beam of S-polarized light.

The yellow fluorescent ray emitted from the rotating wavelength conversion device 29 and the beam BLp of the blue S-polarized light emitted from the rotating diffusion device 42 are combined together by the polarization beam splitter 27 and becomes white illumination light WL. The illumination light WL becomes incident on the uniform illumination system 40 shown in FIG. 1.

The control unit 80 shown in FIG. 1 controls the light source unit 2, the first motor 50, and the second motor 53.

Figure 3:
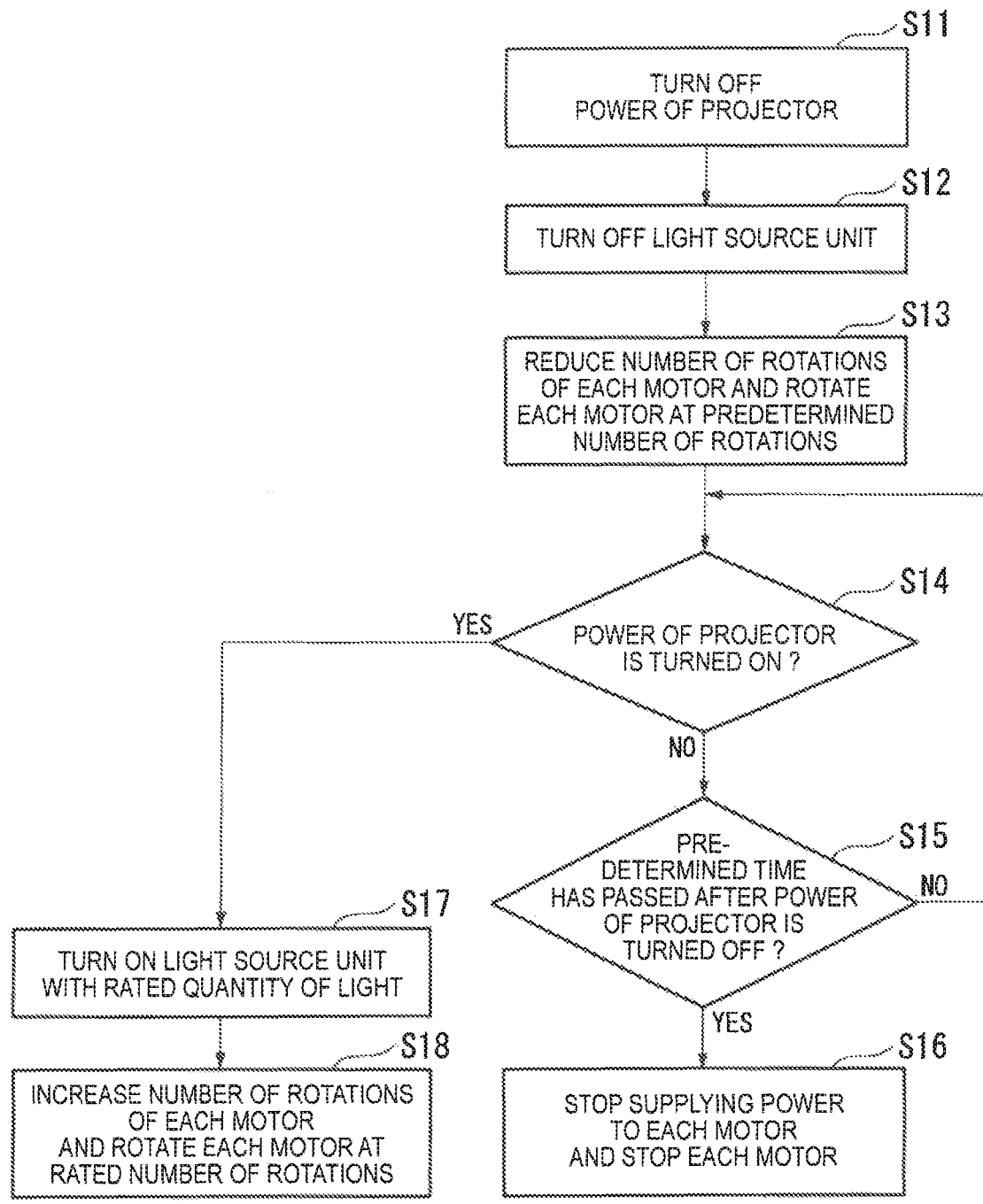
FIG. 3 is a flowchart showing an example of a control procedure of a control unit in the first embodiment.
Figure 4:
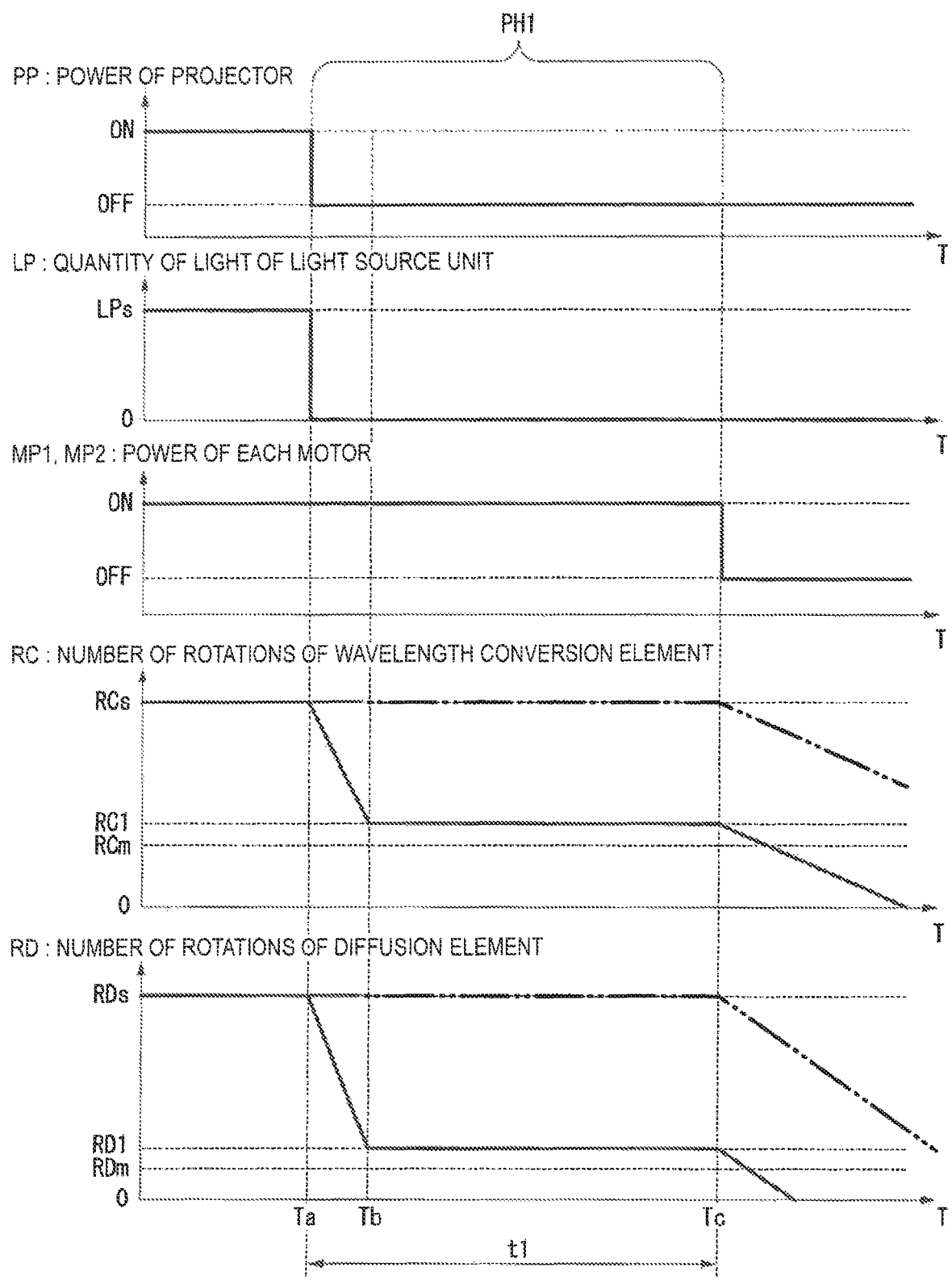
FIG. 4 is a timing chart showing an example of the relationship between the power of a projector, the quantity of light of a light source unit, the power of a first motor and the power of a second motor, the number of rotations of a wavelength conversions element, and the number of rotations of a diffusion element in the first embodiment.
Figure 5:
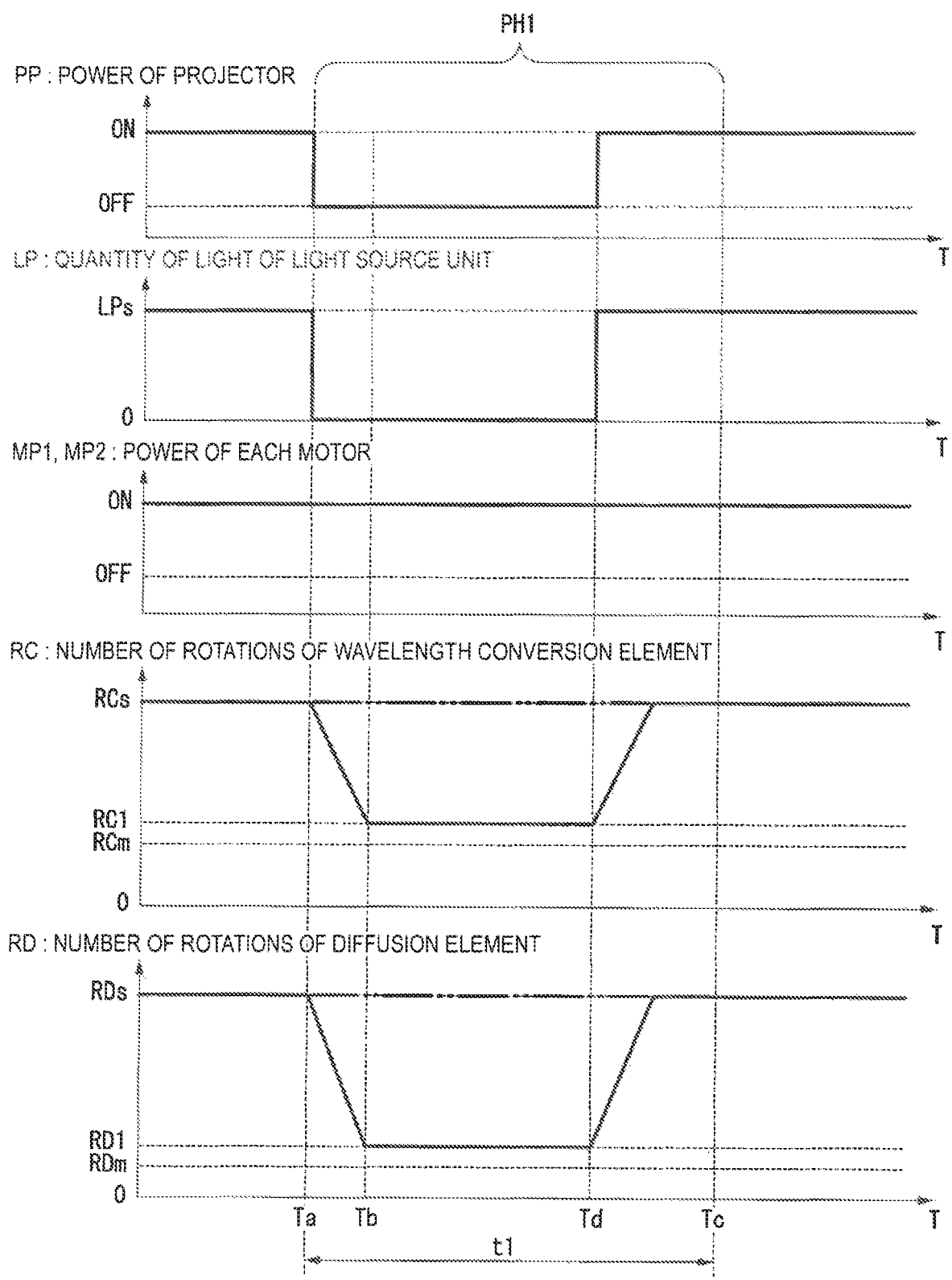
FIG. 5 is a timing chart showing an example of the relationship between the power of a projector, the quantity of light of a light source unit, the power of a first motor and the power of a second motor, the number of rotations of a wavelength conversions element, and the number of rotations of a diffusion element in the first embodiment.

FIG. 3 is a flowchart showing an example of a control procedure of the control unit 80 in this embodiment. FIGS. 4 and 5 are timing charts showing an example of the relationship between the power PP of the projector 1, the quantity of light LP of the light source unit 2, the power MP1 of the first motor 50 and the power MP2 of the second motor 53, the number of rotations RC of the wavelength conversion element 46, and the number of rotations RD of the diffusion element 52. The number of rotations RC of the wavelength conversion element 46 is equivalent to the number of rotations of the first motor 50. The number of rotations RD of the diffusion element 52 is equivalent to the number of rotations of the second motor 53.

FIGS. 4 and 5 show, in order from top, a graph showing change with time in the power PP of the projector 1, a graph showing change with time in the quantity of light LP of the light source unit 2, a graph showing change with time in the power MP1 of the first motor 50 and the power MP2 of the second motor 53, a graph showing change with time in the number of rotations RC of the wavelength conversion element 46, and a graph showing change with time in the number of rotations RD of the diffusion element 52.

In each graph, the vertical axis represents each parameter and the horizontal axis represents time T. In the graph showing change with time in the power PP of the projector 1, whether the power PP is in ON-state or OFF-state is shown. In the graph showing change with time in the powers MP1, MP2 of the respective motors, whether the powers MP1, MP2 are in ON-state or OFF-state is shown. In this embodiment, for example, the change in the power MP1 with time and the change in the power MP2 with time are the same. The features described above of FIGS. 4 and 5 also apply to FIGS. 7 and 8, described later.

FIG. 4 shows the case where, after the power PP of the projector 1 is turned off from on-state, the power PP of the projector 1 is not turned on again during a first period PH1. FIG. 5 shows the case where, after the power PP of the projector 1 is turned off from on-state, the power PP of the projector 1 is turned on again during the first period PH1.

The first period PH1 is a period until a first predetermined time t1 passes after the power PP of the projector 1 is turned off from on-state, that is, a period until the first predetermined time t1 passes after the light source unit 2 is turned off. In FIGS. 4 and 5, the first period PH1 is a period from time Ta to time Tc. The length of the first period PH1 is the first predetermined time t1, for example, approximately 10 seconds (s) or longer, and 30 minutes (min) or shorter.

In the embodiment, the power PP of the projector 1 is equivalent to the power of the light source device 70. That is, when the power PP of the projector 1 is ON, the power of the light source device 70 is ON. When the power PP of the projector 1 is OFF, the power of the light source device 70 is OFF.

As shown in FIG. 3, when the power PP of the projector 1 is turned off (Step S11), the control unit 80 turns off the light source unit 2 (Step S12), reduces the number of rotations of each motor, and rotates each motor at a predetermined number of rotations (first predetermined number of rotations RC1 and second predetermined number of rotations RD1, described later) (Step S13). Thus, as shown in FIG. 4, at the time Ta when the power PP of the projector 1 is turned off, the light source unit 2 is turned off and the quantity of light LP of the light source unit 2 becomes zero. The quantity of light LP of the light source unit 2 before the light source unit 2 is turned off is a rated quantity of light LPs. The rated quantity of light LPs is the quantity of light LP of the light emitted from the light source unit 2 when the drive power supplied to the light source unit 2 is rated power. The time Ta is the time when the first period PH1 starts. In the embodiment, the order in which the light-off control of the light source unit 2 in Step S12 and the reduction control of the number of rotations of the first motor 50 and the number of rotations of the second motor 53 in Step S13 are carried out is not particularly limited. The control unit 80 may simultaneously execute the light-off control and the reduction control of the respective numbers of rotations, or may execute one of these controls first and then execute the other later.

The power MP1 of the first motor 50 and the power MP2 of the second motor 53 are maintained in on-state during the first period PH1 even if the power PP of the projector 1 is turned off. Therefore, the wavelength conversion element 46 and the diffusion element 52 continue rotating during the first period PH1 even if the power PP of the projector 1 is turned off.

The number of rotations RC of the wavelength conversion element 46 is a rated number of rotations RCs before the light source unit 2 is turned off. In the first period PH1, the control unit 80 reduces the number of rotations RC of the wavelength conversion element 46 to a first predetermined number of rotations RC1 that is smaller than the rated number of rotations RCs. During the period from the time Ta when the light source unit 2 is turned off to the time Tb when the number of rotations RC of the wavelength conversion element 46 becomes the first predetermined number of rotations RC1, the number of rotations RC of the wavelength conversion element 46 changes, for example, linearly.

In the embodiment, the first predetermined number of rotations RC1 is smaller than the number of rotations RC of the wavelength conversion element 46 before the light source unit 2 is turned off (rated number of rotations RCs) and equal to or greater than the number of rotations for lighting RCm (first number of rotations for lighting). The number of rotations for lighting RCm is the number of rotations RC of the wavelength conversion element 46 when the lighting of the light source unit 2 is started before the light source unit 2 is turned off.

In this description, "before the light source unit is turned off" includes a period when the light source unit is off during a period other than the first period. That is, in the embodiment, starting the lighting of the light source unit 2 before the light source unit 2 is turned off includes turning on the light source unit 2 in a period that is other than the first period PH1 and when the light source unit 2 is off (for example, a period when the light source unit 2 is off before the time Ta shown in FIGS. 4 and 5).

Also, in this description, "the number of rotations for lighting when the lighting of the light source unit is started" may be any number of rotations with which the lighting of the light source unit can be started, and is not limited to the number of rotations when the lighting of the light source unit is actually started. That is, in the description, "the number of rotations for lighting when the lighting of the light source unit is started" includes a minimum number of rotations with which the lighting of the light source unit can be started. Therefore, for example, even if the number of rotations when the lighting of the light source unit is started is actually greater than the minimum number of rotations with which the lighting of the light source unit can be started, the number of rotations for lighting is not limited to the number of rotations when the lighting of the light source unit is actually started.

In the embodiment, the number of rotations for lighting RCm is the minimum number of rotations when the lighting of the light source unit 2 is started before the light source unit 2 is turned off. That is, in the embodiment, when turning on the light source unit 2 before the light source unit 2 is turned off, the control unit 80 does not turn on the light source unit 2 until the number of rotations RC of the wavelength conversion element 46 reaches the number of rotations for lighting RCm or greater.

The number of rotations for lighting RCm changes, for example, depending on the quantity of light of the light cast on the wavelength conversion element 46. That is, the number of rotations for lighting RCm increases as the quantity of light of the light cast on the wavelength conversion element 46 increases, and the number of rotations for lighting RCm decreases as the quantity of light of the light cast on the wavelength conversion element 46 decreases. In the description below, it is assumed that the number of rotations for lighting RCm is the number of rotations corresponding to the quantity of light of the light cast on the wavelength conversion element 46 in the case where the quantity of light of the light emitted from the light source unit 2 is the rated quantity of light LPs.

The number of rotations RD of the diffusion element 52 is a rated number of rotations RDs before the light source unit 2 is turned off. The rated number of rotations RDs of the diffusion element 52 may be the same as or different from the rated number of rotations RCs of the wavelength conversion element 46. During the first period PH1, the control unit 80 reduces the number of rotations RD of the diffusion element 52 to a second predetermined number of rotations RD1 that is smaller than the rated number of rotations RDs. During the period from the time Ta when the light source unit 2 is turned off to the time Tb when the number of rotations RD of the diffusion element 52 becomes the second predetermined number of rotations RD1, the number of rotations RD of the diffusion element 52 changes, for example, linearly. The slope of the change in the number of rotations RD of the diffusion element 52 may be the same as or different from the slope of the change in the number of rotations RC of the wavelength conversion element 46. In FIGS. 4 and 5, the slope of the change in the number of rotations RD of the diffusion element 52 is, for example, greater than the slope of the change in the number of rotations RC of the wavelength conversion element 46.

In the embodiment, the second predetermined number of rotations RD1 is smaller than the number of rotations RD of the diffusion element 52 before the light source unit 2 is turned off (rated number of rotations RDs) and equal to or greater than the number of rotations for lighting RDm (second number of rotations for lighting). The second predetermined number of rotations RD1 is, for example, smaller than the first predetermined number of rotations RC1. However, this is not limiting. The second predetermined number of rotations RD1 may be greater than the first predetermined number of rotations RC1 or may be equal to the first predetermined number of rotations RC1. The number of rotations for lighting RDm is the number of rotations RD of the diffusion element 52 when the lighting of the light source unit 2 is started before the light source unit 2 is turned off. That is, in the embodiment, when turning on the light source unit 2 before the light source unit 2 is turned off, the control unit 80 does not turn on the light source unit 2 until the number of rotations RD of the diffusion element 52 reaches the number of rotations for lighting RDm or greater.

The number of rotations for lighting RDm changes, for example, depending on the quantity of light of the light cast on the diffusion element 52. That is, the number of rotations for lighting RDm increases as the quantity of light of the light cast on the diffusion element 52 increases, and the number of rotations for lighting RDm decreases as the quantity of light of the light cast on the diffusion element 52 decreases. In the description below, it is assumed that the number of rotations for lighting RDm is the number of rotations corresponding to the quantity of light of the light cast on the diffusion element 52 in the case where the quantity of light of the light emitted from the light source unit 2 is the rated quantity of light LPs.

In the embodiment, the light emitted from the single light source unit 2 becomes incident on the wavelength conversion element 46 and the diffusion element 52. Therefore, in the embodiment, the control unit 80 turns on the light source unit 2 with the rated quantity of light LPs, if the number of rotations RC of the wavelength conversion element 46 is equal to or greater than the number of rotations for lighting RCm, and the number of rotations RD of the diffusion element 52 is equal to or greater than the number of rotations for lighting RDm.

In FIGS. 4 and 5, both the time when the number of rotations RC of the wavelength conversion element 46 reaches the first predetermined number of rotations RC1 and the time when the number of rotations RD of the diffusion element 52 reaches the second predetermined number of rotations RD1 in the first period PH1 are the time Tb. However, this is not limiting. These times may be different from each other.

Next, the control unit 80 determines whether the power PP of the projector 1 is turned on or not (Step S14), as shown in FIG. 3. If the power PP of the projector 1 is not on (NO in Step S14), the control unit 80 determines whether a first predetermined time t1 has passed after the power PP of the projector 1 is turned off, or not (Step S15). In other words, the control unit 80 determines whether, after the light source unit 2 is turned off, the first predetermined time t1 has passed and the first period PH1 is over, or not.

If the first predetermined time t1 has not passed after the power PP of the projector 1 is turned off (NO in Step S15), the control unit 80 determines again whether the power PP of the projector 1 is turned on or not (Step S14). In this way, in the first period PH1 until the first predetermined time t1 passes, the control unit 80 determines whether the power PP of the projector 1 is turned on or not, while continuing rotating the wavelength conversion element 46 and the diffusion element 52.

If the first predetermined time t1 has passed without having the power PP of the projector 1 turned on (YES in Step S15), that is, if the first period PH1 is over, the control unit 80 stops supplying power to each motor and thus stops each motor (Step S16). Thus, as shown in FIG. 4, at the time Tc when the first period PH1 ends, the power MP1 of the first motor 50 and the power MP2 of the second motor 53 are turned off. After the power MP1 of the first motor 50 and the power MP2 of the second motor 53 are turned off, the wavelength conversion element 46 and the diffusion element 52 (first motor 50 and second motor 53) continue rotating at first due to inertia but are gradually reduced in the number of rotations and eventually stop. The change in the number of rotations RC of the wavelength conversion element 46 and the change in the number of rotations RD of the diffusion element 52 after the power MP1 of the first motor 50 and the power MP2 of the second motor 53 are turned off are, for example, linear.

The slope of the change in the number of rotations RC of the wavelength conversion element 46 and the slope of the change in the number of rotations RD of the diffusion element 52 after the power MP1 of the first motor 50 and the power MP2 of the second motor 53 are turned off are decided, for example, by the moment of inertia of each element. For example, the moment of inertia of the diffusion element 52 is smaller than the moment of inertia of the wavelength conversion element 46, and the rotational energy in the rotation of the diffusion element 52 is smaller than the rotational energy in the rotation of the wavelength conversion element 46. Therefore, for example, in FIG. 4, the slope of the change in the number of rotations RD of the diffusion element 52 is greater than the slope of the change in the number of rotations RC of the wavelength conversion element 46, and the diffusion element 52 decelerates faster than the wavelength conversion element 46.

Meanwhile, if the power PP of the projector 1 is turned on before the first predetermined time t1 passes after the light source unit 2 is turned off, that is, within the first period PH1 (YES in Step S14), the control unit 80 turns on the light source unit 2 with the rated quantity of light LPs (Step S17), and increases the number of rotations of each motor and rotates each motor at the rated number of rotations of each motor (Step S18), as shown in FIG. 3. That is, the control unit 80 increases the numbers of rotations of the wavelength conversion element 46 and the diffusion element 52 from the first predetermined number of rotations RC1 and the second predetermined number of rotations RD1 to the numbers of rotations before the light source unit 2 is turned off (rated number of rotations RCs and rated number of rotations RDs). In the embodiment, the order in which the light-on control of the light source unit 2 in Step S17 and the increase control of the number of rotations of the first motor 50 and the number of rotations of the second motor 53 in Step S18 are carried out is not particularly limited. The control unit 80 may simultaneously execute the light-on control and the increase control of the respective numbers of rotations, or may execute one of these controls first and execute the other later.

FIG. 5 shows the case where the power PP of the projector 1 is turned on at the time Td in the first period PH1. As the power PP of the projector 1 is turned on at the time Td, the power of the light source device 70 is turned on and the control unit 80 turns on the light source unit 2 in such a way that the light source unit 2 emits light with the rated quantity of light LPs. Then, the control unit 80 increases the number of rotations of the first motor 50 and thus increases the number of rotations RC of the wavelength conversion element 46 linearly from the first predetermined number of rotations RC1 to the rated number of rotations RCs. The control unit 80 also increases the number of rotations of the second motor 53 and thus increases the number of rotations RD of the diffusion element 52 linearly from the second predetermined number of rotations RD1 to the rated number of rotations RDs.

Here, for example, the moment of inertia of the diffusion element 52 is smaller than the moment of inertia of the wavelength conversion element 46. Therefore, the diffusion element 52 can be rotated more easily than the wavelength conversion element 46 and tends to increase in the number of rotations faster. Thus, for example, the slope of the change in the number of rotations RD of the diffusion element 52 from the second predetermined number of rotations RD1 to the rated number of rotations RDs is greater than the slope of the change in the number of rotations RC of the wavelength conversion element 46 from the first predetermined number of rotations RC1 to the rated number of rotations RCs. The times when the numbers of rotations of the respective elements reach the rated numbers of rotations may be the same or different from each other.

In the case of FIG. 5, if the power PP of the projector 1 is not turned off again even after the first period PH1 passes, the power MP1 of the first motor 50 and the power MP2 of the second motor 53 remain on.

In the way described above, the power PP of the projector 1 is turned on again and the light emitted from the light source device 70 is projected as an image.

The control by the control unit 80 described above can also be expressed as a method for controlling the light source device 70. That is, an embodiment of the method for controlling the light source device 70 in the embodiment is a method for controlling the light source device 70 having the wavelength conversion element 46 on which light becomes incident from the light source unit 2 and the first motor 50 which rotates the wavelength conversion element 46. The method includes: turning off the light source unit 2; and continuing rotating the wavelength conversion element 46 in the first period PH1 until a predetermined time passes after the light source unit 2 is turned off.

For example, normally, when turning on the power PP of the projector from off-state, the control unit turns on the power MP1 of the first motor 50 and the power MP2 of the second motor 53, and turns on the light source unit 2 with the rated quantity of light LPs after the number of rotations RC of the wavelength conversion element 46 reaches the number of rotations for lighting RCm or greater and the number of rotations RD of the diffusion element 52 reaches the number of rotations for lighting RDm or greater.

In this case, it takes, for example, approximately 1 second (s) until the supply of power to the first motor 50 and the second motor 53 is started. Also, since the first motor 50 and the second motor 53 are not provided with a rotation sensor, the control unit cannot grasp the rotational position of the rotor of each motor immediately after the power MP1 of the first motor 50 and the power MP2 of the second motor 53 are turned on from off-state. Therefore, in order to rotate each motor, the position of each rotor needs to be adjusted after the power MP1 of the first motor 50 and the power MP2 of the second motor 53 are turned on. When adjusting the rotational position of each rotor, a predetermined direct current is fed to each motor and each rotor is moved to a predetermined rotational position. Thus, the control unit can adjust the rotational position of each rotor and can rotate the wavelength conversion element 46 and the diffusion element 52 with the respective motors. It takes, for example, approximately 2 seconds (s) to adjust the rotational position of each rotor.

If the number of rotations RC of the wavelength conversion element 46 and the number of rotations RD of the diffusion element 52 are relatively small, when the light from the light source unit 2 becomes incident on each element, the element may be damaged by the heat of the light. Therefore, turning on the light source unit 2 needs to wait until the number of rotations RC of the wavelength conversion element 46 and the number of rotations RD of the diffusion element 52 increase to a certain extent. Specifically, for example, when turning of the light source unit 2 with the rated quantity of light LPs, the number of rotations RC of the wavelength conversion element 46 needs to be equal to or greater than the number of rotations for lighting RCm, and the number of rotations RD of the diffusion element 52 needs to be equal to or greater than the number of rotations for lighting RDm. It takes, for example, approximately 2 seconds (s) until each element becomes equal to or greater than its number of rotations for lighting.

As described above, normally, when the power PP of the projector is turned on from off-state, it takes approximately 5 seconds (s) until light is emitted from the light source unit 2 and an image is projected from the projector.

Particularly, immediately after the power PP of the projector is turned off and the power MP1 of the first motor 50 and the power MP2 of the second motor 53 are turned off, the wavelength conversion element 46 and the diffusion element 52 continue rotating at first due to inertia, as described above. In this state, the rotational position of the rotor of each motor cannot be adjusted well in some cases. Therefore, in order to drive each motor again, it is necessary to wait until the rotation of each element due to inertia subsides. Thus, in the case where the power PP of the projector is turned off by mistake or the like, there is a problem that it takes more time to project an image even if the power PP of the projector is turned on again immediately after the power PP of the projector is turned off.

If the adjustment of the rotational position is carried out and fails while each element continues rotating due to inertia, it take more time to rotate each motor and consequently it takes more time until an image is projected from the projector.

According to this embodiment, in order to cope with the problem described above, the control unit 80 controls the first motor 50 and the second motor 53 in such a way as to continue rotating the wavelength conversion element 46 and the diffusion element 52 during the first period PH1 until a predetermined time passes after the light source unit 2 is turned off. Therefore, even in the case where the power PP of the projector 1 is turned on and the light source unit 2 is thus turned on in the first period PH1, the time to start supplying power to each motor is not needed since power is already supplied to each motor. Also, since each motor is already in the rotating state, there is no need to adjust the rotational position of each motor. Therefore, the time until light is emitted from the light source unit 2 after the power PP of the projector 1 is turned on again can be reduced. Thus, according to this embodiment, the light source device 70 which can reduce the time until light is emitted after startup is provided.

As a result, when the power PP of the projector 1 is turned on again after the power PP of the projector 1 is turned off, the time until light is emitted from the light source device 70 and an image is projected, can be reduced. Thus, convenience for the user can be improved.

Also, according to the embodiment, in the first period PH1, the control unit 80 sets the number of rotations RC of the wavelength conversion element 46 to the first predetermined number of rotations RC1 and sets the number of rotations RD of the diffusion element 52 to the second predetermined number of rotations RD1. The first predetermined number of rotations RC1 is smaller than the number of rotations RC of the wavelength conversion element 46 before the light source unit 2 is turned off, and equal to or greater than the number of rotations for lighting RCm. The second predetermined number of rotations RD1 is smaller than the number of rotations RD of the diffusion element 52 before the light source unit 2 is turned off, and equal to or greater than the number of rotations for lighting RDm.

Therefore, when the power PP of the projector 1 is turned on again in the first period PH1, it takes no time until the number of rotations of each element becomes equal to or greater than the number of rotations for lighting, and the light source unit 2 can be turned on immediately with the rated quantity of light LPs. Thus, the time until light is emitted after the power PP of the projector 1 is turned on to start up the light source device 70 can be reduced further. Also, even if the light source unit 2 is turned on immediately with the rated quantity of light LPs, damage to the wavelength conversion element 46 and the diffusion element 52 due to the heat of the light emitted from the light source unit 2 can be restrained since the number of rotations of each element is equal to or greater than the number of rotations for lighting.

Since the number of rotations of each element is made smaller than the rated number of rotations in the first period PH1, the power consumption by each motor to rotate each element can be reduced. Thus, the power consumption by the light source device 70 can be reduced. Also, since the number of rotations can be made relatively small, the noise generated by the rotation of the motors in the first period PH1 can be reduced.

Also, according to the embodiment, when turning on the light source unit 2 in the first period PH1, the control unit 80 turns on the light source unit 2 and increases the number of rotations RC of the wavelength conversion element 46 from the first predetermined number of rotations RC1 to the rated number of rotations RCs. The control unit 80 also increases the number of rotations RD of the diffusion element 52 from the second predetermined number of rotations RD1 to the rated number of rotations RDs.

In this description, that the number of rotations of each element is increased to a predetermined number of rotations includes the case where the number of rotations of each element becomes substantially the same as the predetermined number of rotations, in addition to the case where the number of rotations of each element becomes exactly the same as the predetermined number of rotations. That the number of rotations of each element becomes substantially the same as the predetermined number of rotations includes the case where the ratio of the number of rotations of each element to the predetermined number of rotations is 0.9 or higher and 1.1 or lower. In the above description, the control unit 80 increases the number of rotations of each element until it becomes the same as the rated number of rotations. Therefore, damage to the wavelength conversion element 46 and the diffusion element 52 due to the heat of the light emitted from the light source unit 2 can be restrained further.

Moreover, according to the embodiment, when turning on the light source unit 2 in the first period PH1, the control unit 80 turns on the light source unit 2 with the quantity of light before the light source unit 2 is turned off, that is, with the rated quantity of light LPs. Therefore, the quantity of light LP of the light emitted from the light source device 70 can be made similar to the quantity of light in normal lighting, from when the power PP of the projector 1 is turned on again and the light source unit 2 is turned on. Thus, the brightness of an image projected from the projector 1 can be made similar to the brightness in normal lighting, from immediately after the projector 1 is started up again.

Also, according to the embodiment, the first optical element is a wavelength conversion element which converts the wavelength of light incident from the light source unit 2, or a diffusion element which diffuses light incident from the light source unit 2. Therefore, the embodiment can be applied to a light source device having one of these elements. In this embodiment, the first optical element and the second optical elements are provided as rotating optical elements. The first optical element is the wavelength conversion element 46 and the second optical element is the diffusion element 52. Therefore, the embodiment can be applied to a light source device having both of the wavelength conversion element 46 and the diffusion element 52.

Also, according to the embodiment, in the first period PH1, the control unit 80 sets the number of rotations RD of the diffusion element 52 to be smaller than the number of rotations RC of the wavelength conversion element 46. For example, in some cases, the diffusion element 52 may be more heat-resistant than the wavelength conversion element 46, and the number of rotations for lighting RDm (second number of rotations for lighting) of the diffusion element 52 may be smaller than the number of rotations for lighting RCm (first number of rotations for lighting) of the wavelength conversion element 46. In such cases, in the first period PH1, the second predetermined number of rotations RD1 of the diffusion element 52 can be made equal to or greater than the number of rotations for lighting RDm even if the second predetermined number of rotations RD1 is smaller than the first predetermined number of rotations RC1 of the wavelength conversion element 46. Therefore, while the number of rotations RD of the diffusion element 52 in the first period PH1 is reduced further, damage to the diffusion element 52 can be restrained even if the light source unit 2 is turned on immediately when the power PP of the projector 1 is turned on again. Thus, the power consumption and noise of the second motor 53, which rotates the diffusion element 52, can be reduced further.

Also, the light source device 70 in the embodiment is a light source device installed in the projector 1. Recently, fast startup is increasingly demanded of projectors. Therefore, the advantageous effect that the time of turning on the light source unit again can be reduced is particularly significant when the light source device 70 is installed in a projector.

In the first period PH1, the control unit 80 may maintain the number of rotations RC of the wavelength conversion element 46 to be the number of rotations of the wavelength conversion element 46 before the light source unit 2 is turned off, that is, the rated number of rotations RCs, and may maintain the number of rotations RD of the diffusion element 52 to be the number of rotations of the diffusion element 52 before the light source unit 2 is turned off, that is, the rated number of rotations RDs, as indicated by chain double-dashed lines in FIGS. 4 and 5. In the sections indicated by the chain double-dashed lines in FIGS. 4 and 5, the control unit 80 maintains the number of rotations RC of the wavelength conversion element 46 to be the rated number of rotations RCs and maintains the number of rotations RD of the diffusion element 52 to be the rated number of rotations RDs. With this configuration, there is no need to reduce the number of rotations of each element in the first period PH1. Also, as shown in FIG. 5, in the case where the power PP of the projector 1 is turned on in the first period PH1, there is no need to increase the number of rotations of each element. Therefore, the control by the control unit 80 can be simplified.

Second Embodiment

A second embodiment is different from the first embodiment in that the control unit 80 sets the number of rotations of each element to be smaller than each number of rotations for lighting in the first period PH1. The description of components similar to those in the foregoing embodiment is omitted in some cases, where these components are denoted by the same reference signs or the like.

Figure 6:
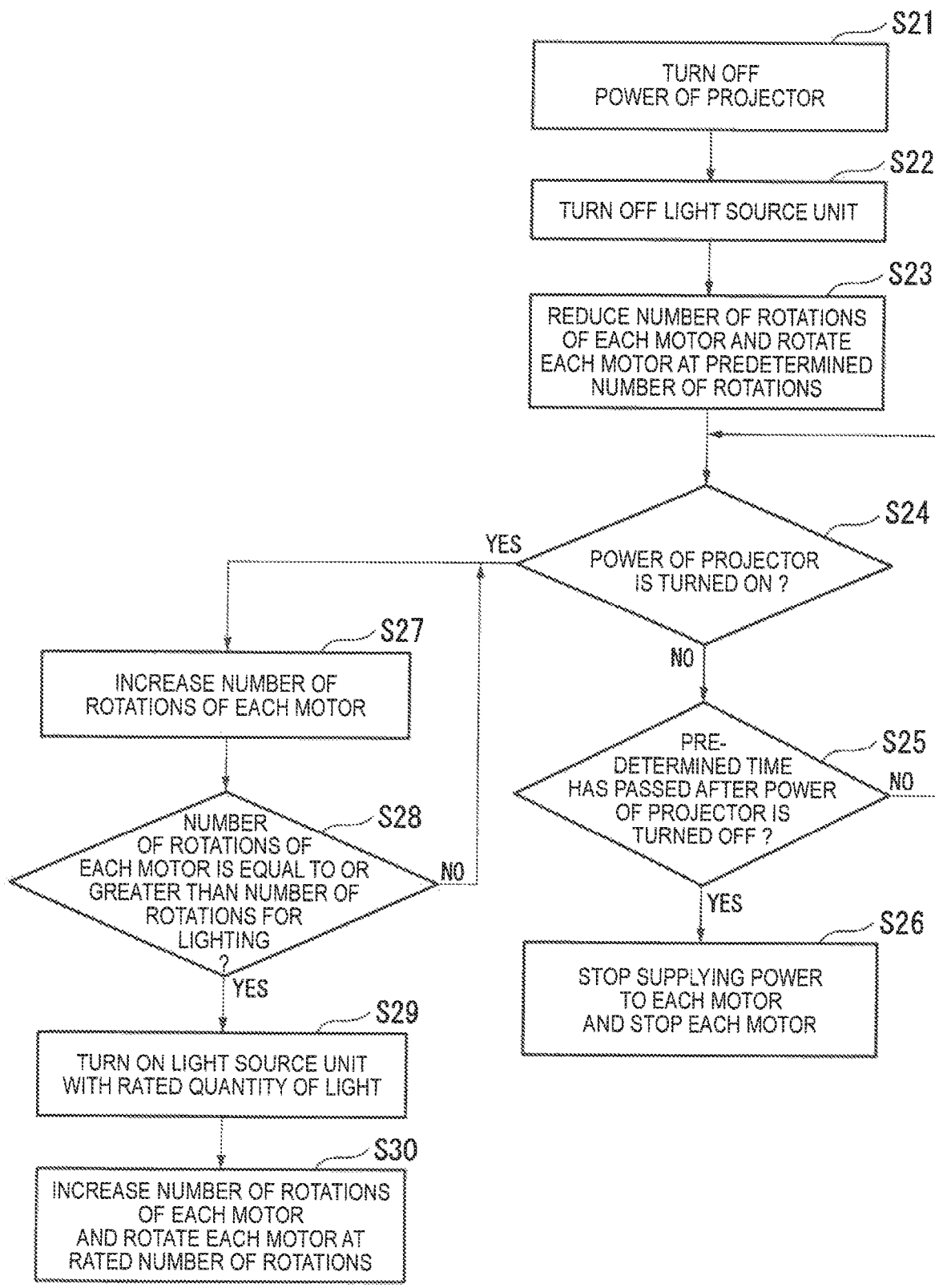
FIG. 6 is a flowchart showing an example of a control procedure of a control unit in a second embodiment.
Figure 7:
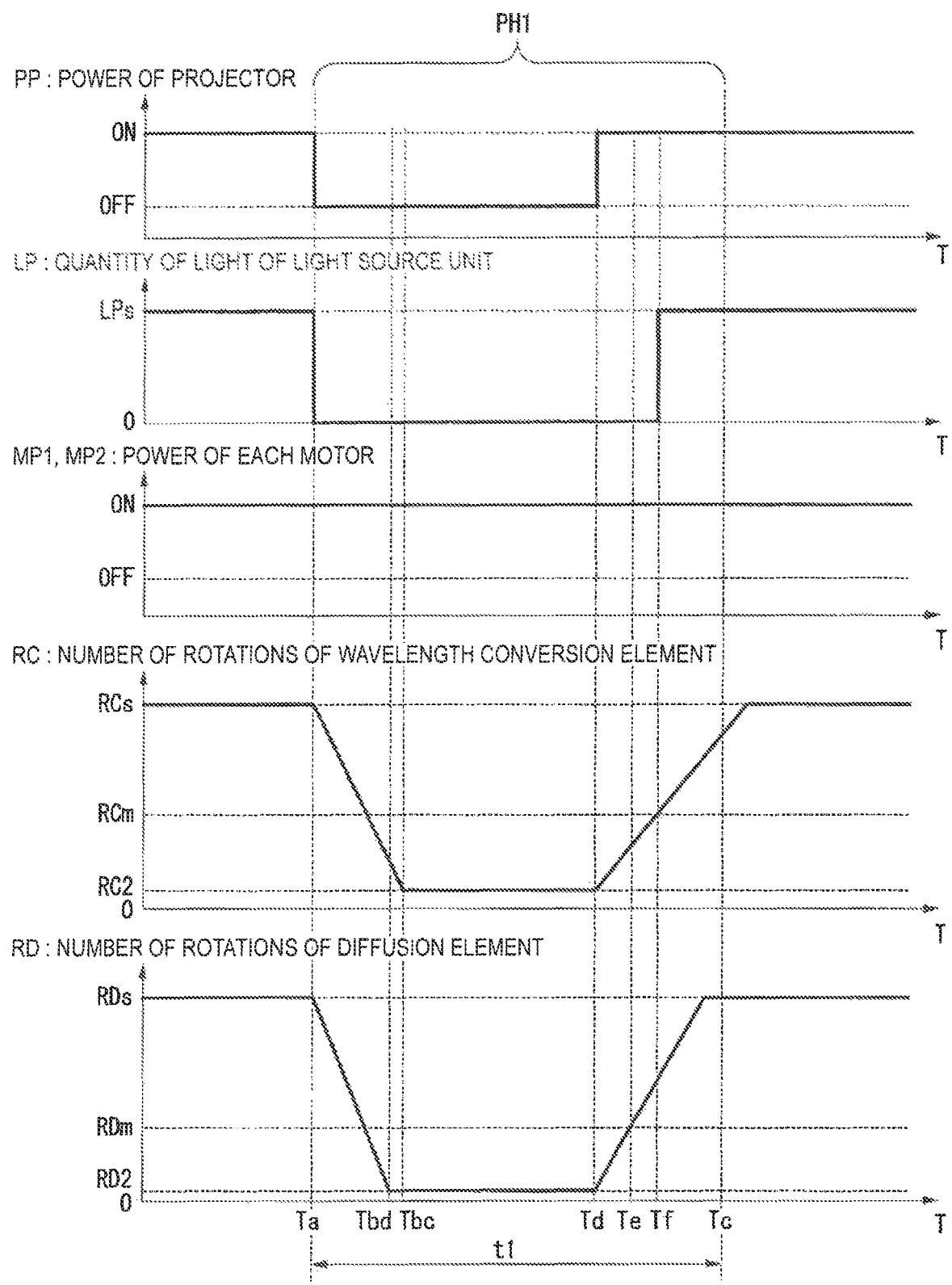
FIG. 7 is a timing chart showing an example of the relationship between the power of a projector, the quantity of light of a light source unit, the power of a first motor and the power of a second motor, the number of rotations of a wavelength conversions element, and the number of rotations of a diffusion element in the second embodiment.

FIG. 6 is a flowchart showing an example of a control procedure of the control unit 80 in this embodiment. FIG. 7 is a timing chart showing an example of the relationship between the power PP of the projector 1, the quantity of light LP of the light source unit 2, the power MP1 of the first motor 50 and the power MP2 of the second motor 53, the number of rotations RC of the wavelength conversion element 46, and the number of rotations RD of the diffusion element 52. FIG. 7 shows the case where, after the power PP of the projector 1 is turned off, the power PP of the projector 1 is turned on again during the first period PH1.

As shown in FIG. 6, when the power PP of the projector 1 is turned off (Step S21), the control unit 80 turns off the light source unit 2 (Step S22), and then reduces the number of rotations of each motor and rotates each motor at a predetermined number of rotations (first predetermined number of rotations RC2 and second predetermined number of rotations RD2, described later) (Step S23). As shown in FIG. 7, in the first period PH1, the control unit 80 reduces the number of rotations RC of the wavelength conversion element 46 to a first predetermined number of rotations RC2 which is smaller than the rated number of rotations RCs. In this embodiment, the first predetermined number of rotations RC2 of the wavelength conversion element 46 is smaller than the number of rotations for lighting RCm (first number of rotations for lighting). Also, in the first period PH1, the control unit 80 reduces the number of rotations RD of the diffusion element 52 to a second predetermined number of rotations RD2 which is smaller than the rated number of rotations RDs. In this embodiment, the second predetermined number of rotations RD2 of the diffusion element 52 is smaller than the number of rotations for lighting RDm (second number of rotations for lighting). Also, for example, the second predetermined number of rotations RD2 is smaller than the first predetermined number of rotations RC2.

As in the foregoing embodiment, the order in which the light-off control of the light source unit 2 in Step S22 and the reduction control of the number of rotations of the first motor 50 and the number of rotations of the second motor 53 in Step S23 are carried out is not particularly limited. The control unit 80 may simultaneously execute the light-off control and the reduction control of the respective numbers of rotations, or may execute one of these controls first and then execute the other later.

In this embodiment, the time Tbc when the number of rotations RC of the wavelength conversion element 46 reaches the first predetermined number of rotations RC2 is later than the time Tbd when the number of rotations RD of the diffusion element 52 reaches the second predetermined number of rotations RD2. However, the time Tbc and the time Tbd may be the same. Alternatively, the time Tbc may be earlier than the time Tbd.

Next, the control unit 80 determines whether the power PP of the projector 1 is turned on or not (Step S24), as shown in FIG. 6. If the power PP of the projector 1 is not on (NO in Step S24), the control unit 80 determines whether a first predetermined time t1 has passed after the power PP of the projector 1 is turned off, or not (Step S25). That is, the control unit 80 determines whether the first period PH1 is over or not. If the first predetermined time t1 has passed without having the power PP of the projector 1 turned on (YES in Step S25), that is, if the first period PH1 is over, the control unit 80 stops supplying power to each motor and thus stops each motor (Step S26), as in the first embodiment.

Meanwhile, if the power PP of the projector 1 is turned on before the first predetermined time t1 passes after the light source unit 2 is turned off, that is, within the first period PH1 (YES in Step S24), the control unit 80 increases the number of rotations of each motor (Step S27). In this embodiment, the control unit 80 increases the number of rotations of each motor and thus increases the number of rotations of each element, for example, linearly toward each rated number of rotations, from the time Td when the power PP of the projector 1 is turned off, as shown in FIG. 7. At this time, the light source unit 2 remains off. That is, when turning on the light source unit 2 in the first period PH1, the control unit 80 in this embodiment increases the number of rotations of the wavelength conversion element 46 and the number of rotations of the diffusion element 52 from the first predetermined number of rotations RC2 and the second predetermined number of rotations RD2, respectively, in the state where the light source unit 2 is off.

Next, the control unit 80 determines whether the number of rotations of each motor, that is, the number of rotations of each element is equal to or greater than the number of rotations for lighting, or not (Step S28), as shown in FIG. 6. If the number of rotations of each motor is smaller than the number of rotations for lighting (NO in Step S28), the control unit 80 continues increasing the number of rotations of each motor (each element) in the state where the light source unit 2 remains off.

Meanwhile, if the number of rotations of each motor is equal to or greater than the number of rotations for lighting (YES in Step S28), the control unit 80 turns on the light source unit 2 with the rated quantity of light LPs (Step S29). As shown in FIG. 7, in this embodiment, the time Tf when the number of rotations of the first motor 50, that is, the number of rotations RC of the wavelength conversion element 46 reaches the number of rotations for lighting RCm, and the time Te when the number of rotations of the second motor 53, that is, the number of rotations RD of the diffusion element 52 reaches the number of rotations for lighting RDm, are different from each other. In FIG. 7, the time Tf is later than the time Te. Therefore, at the time Tf when the number of rotations RC of the wavelength conversion element 46 reaches the number of rotations for lighting RCm, the numbers of rotations of both elements are equal to or greater than their respective numbers of rotations for lighting. Therefore, the control unit 80 turns on the light source unit 2 with the rated quantity of light LPs at the time Tf when the number of rotations RC of the wavelength conversion element 46 reaches the number of rotations for lighting RCm.

Then, the control unit 80 continues increasing the number of rotations of each motor (number of rotations of each element) in the state where the light source unit 2 is on, and rotates each motor (each element) at the rated number of rotations thereof (Step S30). In this embodiment, the order in which the light-on control of the light source unit 2 in Step S29 and the increase control of the number of rotations of the first motor 50 and the number of rotations of the second motor 53 in Step S30 are carried out is not particularly limited. The control unit 80 may simultaneously execute the light-on control and the increase control of the respective numbers of rotations, or may execute one of these controls first and then execute the other later.

In the way described above, the power PP of the projector 1 is turned on again and the light emitted from the light source device 70 is projected as an image. The other parts of the configuration and method in this embodiment are similar to the configuration and method in the first embodiment.

According to this embodiment, the first predetermined number of rotations RC2 is smaller than the number of rotations for lighting RCm, and the second predetermined number of rotations RD2 is smaller than the number of rotations for lighting RDm. Therefore, the power consumption and noise of each motor in the first period PH1 can be reduced.

Also, according to this embodiment, when turning on the light source unit 2 in the first period PH1, the control unit 80 increases the number of rotations of each element in the state where the light source unit 2 is off, and then turns on the light source unit 2 when the number of rotations of each element reaches the number of rotations for lighting. Therefore, the light source unit 2 is not turned on in the state where the number of rotations of each element is smaller than the number of rotations for lighting. Thus, damage to each element due to the heat of the light emitted from the light source unit 2 can be restrained.

The control unit 80 may turn on the light source unit 2 after the time Tf when the number of rotations RC of the wavelength conversion element 46 reaches the number of rotations for lighting RCm.

Third Embodiment

A third embodiment is different from the second embodiment in that the control unit 80 turns on the light source unit 2 when the power PP of the projector 1 is turned on again in the first period PH1. The description of components similar to those in the foregoing embodiments is omitted in some cases, where these components are denoted by the same reference signs or the like.

Figure 8:
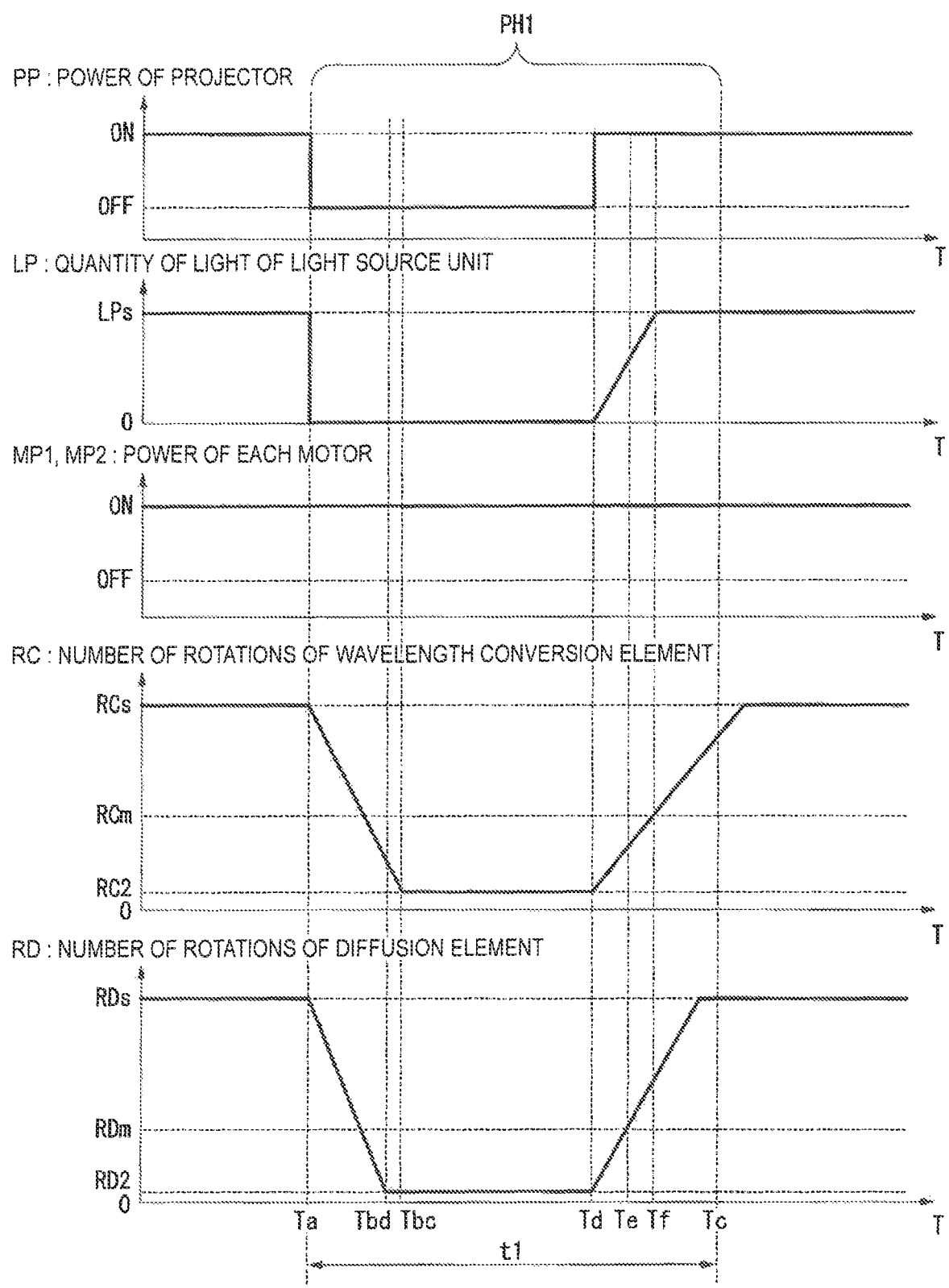
FIG. 8 is a timing chart showing an example of the relationship between the power of a projector, the quantity of light of a light source unit, the power of a first motor and the power of a second motor, the number of rotations of a wavelength conversions element, and the number of rotations of a diffusion element in a third embodiment.

FIG. 8 is a timing chart showing an example of the relationship between the power PP of the projector 1, the quantity of light LP of the light source unit 2, the power MP1 of the first motor 50 and the power MP2 of the second motor 53, the number of rotations RC of the wavelength conversion element 46, and the number of rotations RD of the diffusion element 52.

In this embodiment, when turning on the light source unit 2 in the first period PH1, the control unit 80 increases the number of rotations of each element from each predetermined number of rotations, then turns on the light source unit 2 for a second predetermined time with a quantity of light that is smaller than the quantity of light in the lighting of the light source unit 2 (rated quantity of light LPs) started in response to the number of rotations of each element reaching its number of rotations for lighting, and increases the quantity of light LP of the light source unit 2 toward the rated quantity of light LPs, as shown in FIG. 8. In FIG. 8, the control unit 80 increases the quantity of light LP of the light source unit 2 linearly from 0 to the rated quantity of light LPs in the period (second predetermined time) from the time Td when the power PP of the projector 1 is turned on to the time Tf when the number of rotations RC of the wavelength conversion element 46 reaches the number of rotations for lighting RCm. That is, the control unit 80 increases the quantity of light of the light source unit 2 until the second predetermined time passes after the power PP of the projector 1 is turned on from off-state during the first period PH1. The other parts of the configuration and method in this embodiment are similar to the configuration and method in the second embodiment.

As described above, each number of rotations for lighting changes according to the quantity of light of the light cast on each element. Therefore, for example, even in the case where the number of rotations of each element is smaller than the number of rotations for lighting, if the quantity of light LP of the light source unit 2 is smaller than the quantity of light LP of the light source unit 2 corresponding to the number of rotations for lighting, damage to each element can be restrained when light is cast onto each element from the light source unit 2. Thus, according to this embodiment, the light source unit 2 is turned on at first with a smaller quantity of light LP than the rated quantity of light LPs. Therefore, in the case where the number of rotations of each element is made smaller than the number of rotations for lighting in the first period PH1, damage to each element due to the light from the light source unit 2 can be restrained even if the light source unit 2 is turn on at the moment when the power PP of the projector 1 is turned on. Therefore, while the number of rotations of each element is made relatively small during the first period PH1 and the power consumption and noise of the light source device 70 are thus reduced, the time until light is emitted after the power PP of the projector 1 is turned on and the light source device 70 is started up, can be reduced. Since the quantity of light LP of the light source unit 2 is increased toward the rated quantity of light LPs with the increase in the number of rotations of each element, the luminance of an image projected from the projector 1 can be made equal to normal luminance.

Also, according to this embodiment, the time when the quantity of light LP of the light source unit 2 reaches the rated quantity of light LPs is the time Tf when the number of rotations RC of the wavelength conversion element 46 reaches the number of rotations for lighting RCm. Therefore, at the point when the quantity of light LP of the light source unit 2 reaches the rated quantity of light LPs, both of the number of rotations RC of the wavelength conversion element 46 and the number of rotations RD of the diffusion element 52 are equal to or greater than their respective numbers of rotations for lighting. Thus, damage to each element due to the light emitted from the light source unit 2 can be restrained further.

The control unit 80 may increase the quantity of light LP of the light source unit 2 stepwise or non-linearly after the power PP of the projector 1 is turned on in the first period PH1. Also, the control unit 80 may set the quantity of light LP of the light source unit 2 to a value that is greater than 0 and smaller than the rated quantity of light LPs at the time Td when the power PP of the projector 1 is turned on. The time when the quantity of light LP of the light source unit 2 reaches the rated quantity of light LPs may be later than the time Tf.

In the foregoing embodiments, the control unit 80 is configured to maintain the number of rotations of each element to a predetermined number of rotations that is constant, until the power PP of the projector 1 is turned on or until the first period PH1 is over after the number of rotations of each element is reduced to the predetermined number of rotations in the first period PH1. However, this is not limiting. The control unit 80 may change the number of rotations of each element in the first period PH1. That is, the first predetermined number of rotations and the second predetermined number of rotations may change instead being constant values. Also, in the foregoing embodiments, the control unit 80 sets the number of rotations of each element in the first period PH1 to the rated number of rotations or smaller. However, this is not limiting. For example, the control unit 80 may set the number of rotations of each element to be greater than the rated number of rotations in the first period PH1.

In the foregoing embodiments, the control unit 80 is configured to continue rotating both the wavelength conversion element 46 and the diffusion element 52 in the first period PH1. However, this is not limiting. The control unit 80 may be configured to continue rotating one of the wavelength conversion element 46 and the diffusion element 52 in the first period PH1.

For example, the diffusion element 52 is more heat-resistant and has a smaller moment of inertia than the wavelength conversion element 46. Therefore, the number of rotations for lighting of the diffusion element 52 can be made smaller than that of the wavelength conversion element 46, and the number of rotations RD can be easily increased. Therefore, for example, even if the rotation of the diffusion element 52 is stopped in the first period PH1, the number of rotations RD of the diffusion element 52 can be increased to the number of rotations for lighting RDm after the power PP of the projector 1 is turned on. Thus, for example, even in the case where only the wavelength conversion element 46 continues being rotated in the first period PH1, the time until light is emitted after the projector 1 (light source device 70) is started up can be reduced.

In the foregoing embodiments, light becomes incident on both the wavelength conversion element 46 and the diffusion element 52 from the single light source unit 2. However, this is not limiting. Light source units for making light incident on the respective elements may be provided. In this case, in the second embodiment, the timings when the respective light source units are turned on may be different from each other. Also, in the foregoing embodiments, one of the wavelength conversion element 46 and the diffusion element 52 may be a non-rotating element. For example, if the wavelength conversion element 46 is a non-rotating element and the diffusion element 52 is a rotating element, the diffusion element 52 is equivalent to the first optical element and the second optical element may be omitted. Also, while the first optical element and the second optical element rotated by the motors in the foregoing embodiments are the wavelength conversion element 46 and the diffusion element 52, the first optical element and the second optical element are not particularly limited, provided that the light from the light source unit 2 becomes incident these optical elements and that these optical elements are rotated.

Also, in the foregoing embodiments, it is assumed that the change in the state of the power MP1 of the first motor 50 and the change in the state of the power MP2 of the second motor 53 are the same. However, this is not limiting. These changes may be different from each other. For example, a predetermined time during which the power MP1 of the first motor 50 is kept on after the power PP of the projector 1 is turned off, and a predetermined time during which the power MP2 of the second motor 53 is kept on after the power PP of the projector 1 is turned off may be different from each other. That is, the length of the first period may be different between the wavelength conversion element 46 and the diffusion element 52. In this case, after the power PP of the projector 1 is turned off, the powers of the respective motors are turned off at different timings from each other unless the power PP of the projector 1 is turned on.

As an example, if the length of the first period during which the rotation of the wavelength conversion element 46 is maintained is longer than the length of the first period during which the rotation of the diffusion element 52 is maintained, first, when the first period during which the rotation of the diffusion element 52 is maintained is over, the second motor 53 is stopped and the rotation of the diffusion element 52 stops. After that, until the first period during which the rotation of the wavelength conversion element 46 is maintained is over, the diffusion element 52 is stopped and the wavelength conversion element 46 rotates. Then, when the first period during which the rotation of the wavelength conversion element 46 is maintained is over, the first motor 50 is stopped and the wavelength conversion element 46 stops. Thus, each motor stops and the rotation of each element stops.

In the foregoing embodiments, an example in the case where the invention is applied to a transmission-type projector is described. However, the term "transmission-type" means a type in which a light modulation device (liquid crystal light valve) including a liquid crystal panel or the like transmits light. The term "reflection-type" means a type in which a light modulation device (liquid crystal light valve) reflects light. The light modulation device is not limited to the liquid crystal panel or the like and may be, for example, a light modulation device using a micromirror.

In the foregoing embodiments, the example of the projector 1 using the three light modulation devices 4R, 4G, 4B is described. However, the invention can also be applied to a projector using only one light modulation device or a projector using four or more light modulation devices.

The use of the light source device in the foregoing embodiments is not particularly limited. The light source device in the foregoing embodiments can also be applied to devices other than the projector.

The configurations described above can be combined together where appropriate, provided that these configurations are not contradictory to each other.

The entire disclosure of Japanese Patent Application No. 2017-014020, filed Jan. 30, 2017 is expressly incorporated by reference herein.

What is claimed is:

1. A light source device comprising:
a light source unit configured to emit light;
a first optical element on which the light emitted from the light source unit is incident;
a first drive unit configured to rotate the first optical element; and
a control unit configured to control the light source unit and the first drive unit,
wherein
the control unit is configured to continue rotating the first optical element during a first period until a first predetermined time passes after the light source unit is turned off,
the control unit sets a number of rotations of the first optical element to a predetermined number of rotations in the first period, and
the predetermined number of rotations is smaller than a number of rotations of the first optical element before the light source unit is turned off and is equal to or greater than a number of rotations for lighting of the first optical element when lighting of the light source unit is started before the light source unit is turned off.

2. The light source device according to claim 1,
wherein in the case where the light source unit is turned on in the first period, the control unit turns on the light source unit and increases the number of rotations of the first optical element from the predetermined number of rotations to the number of rotations of the first optical element before the light source unit is turned off.

3. A projector comprising:
the light source device according to claim 2;
a light modulation device configured to modulate light emitted from the light source device according to an image signal; and
a projection system configured to project the light modulated by the light modulation device.

4. The light source device according to claim 1,
wherein, in the first period, the control unit maintains the number of rotations of the first optical element to the number of rotations of the first optical element before the light source unit is turned off.

5. A projector comprising:
the light source device according to claim 4;
a light modulation device configured to modulate light emitted from the light source device according to an image signal; and
a projection system configured to project the light modulated by the light modulation device.

6. The light source device according to claim 1,
wherein in the case where the light source unit is turned on in the first period, the control unit turns on the light source unit with a quantity of light before the light source unit is turned off.

7. A projector comprising:
the light source device according to claim 6;
a light modulation device configured to modulate light emitted from the light source device according to an image signal; and
a projection system configured to project the light modulated by the light modulation device.

8. The light source device according to claim 1,
wherein the control unit stops the rotation of the first optical element in the case where the light source unit is not turned on in the first period.

9. A projector comprising:
the light source device according to claim 8;
a light modulation device configured to modulate light emitted from the light source device according to an image signal; and
a projection system configured to project the light modulated by the light modulation device.

10. A projector comprising:
the light source device according to claim 1;
a light modulation device configured to modulate light emitted from the light source device according to an image signal; and
a projection system configured to project the light modulated by the light modulation device.

11. A light source device comprising:
a light source unit configured to emit light;
a first optical element on which the light emitted from the light source unit is incident;
a first drive unit configured to rotate the first optical element; and
a control unit configured to control the light source unit and the first drive unit, wherein
the control unit is configured to continue rotating the first optical element during a first period until a first predetermined time passes after the light source unit is turned off,
the control unit sets a number of rotations of the first optical element to a predetermined number of rotations in the first period, and
the predetermined number of rotations is smaller than a number of rotations for lighting of the first optical element when lighting of the light source unit is started before the light source unit is turned off.

12. The light source device according to claim 11,
wherein in the case where the light source unit is turned on in the first period, the control unit
increases the number of rotations of the first optical element from the predetermined number of rotations,
turns on the light source unit for a second predetermined time with a smaller quantity of light than a quantity of light in the lighting of the light source unit, the lighting started in response to the number of rotations of the first optical element reaching the number of rotations for lighting, and
increases the quantity of light of the light source unit.

13. A projector comprising:
the light source device according to claim 12;
a light modulation device configured to modulate light emitted from the light source device according to an image signal; and
a projection system configured to project the light modulated by the light modulation device.

14. The light source device according to claim 11,
wherein in the case where the light source unit is turned on in the first period, the control unit
increases the number of rotations of the first optical element from the predetermined number of rotations in the state where the light source unit is off, and
turns on the light source unit when the number of rotations of the first optical element becomes equal to or greater than the number of rotations for lighting.

15. A projector comprising:
the light source device according to claim 14;
a light modulation device configured to modulate light emitted from the light source device according to an image signal; and
a projection system configured to project the light modulated by the light modulation device.

16. A projector comprising:
the light source device according to claim 11;
a light modulation device configured to modulate light emitted from the light source device according to an image signal; and
a projection system configured to project the light modulated by the light modulation device.

17. A light source device comprising:
a light source unit configured to emit light;
a first optical element on which the light emitted from the light source unit is incident;
a first drive unit configured to rotate the first optical element; and
a control unit configured to control the light source unit and the first drive unit,
wherein
the control unit is configured to continue rotating the first optical element during a first period until a first predetermined time passes after the light source unit is turned off, and
the first optical element is a wavelength conversion element configured to convert a wavelength of light incident from the light source unit, or is a diffusion element configured to diffuse light incident from the light source unit,
the light source device further comprising:
a second optical element on which the light emitted from the light source unit is incident; and
a second drive unit configured to rotate the second optical element,
wherein
the control unit rotates the second optical element in the first period,
the first optical element is the wavelength conversion element,
the second optical element is the diffusion element, and
in the first period, a number of rotations of the second optical element is smaller than a number of rotations of the first optical element.

18. A projector comprising:
the light source device according to claim 17;
a light modulation device configured to modulate light emitted from the light source device according to an image signal; and
a projection system configured to project the light modulated by the light modulation device.

19. A method for controlling a light source device including a light source unit configured to emit light, a first optical element on which light emitted from the light source unit is incident, a control unit, and a first drive unit configured to rotate the first optical element, the method comprising:
turning off the light source unit; and
continuing rotating the first optical element during a first period until a first predetermined time passes after the light source unit is turned off, wherein
the control unit sets a number of rotations of the first optical element to a predetermined number of rotations in the first period, and
the predetermined number of rotations is smaller than a number of rotations of the first optical element before the light source unit is turned off and is equal to or greater than a number of rotations for lighting of the first optical element when lighting of the light source unit is started before the light source unit is turned off.

* * * * *